United States Patent Office
2,748,099
Patented May 29, 1956

2,748,099

POLYAMIDE COMPOSITIONS CONTAINING A HIGH PERCENTAGE OF METAL FILLER

Walter M. Bruner and Peter J. Wayne, Wilmington, Del., assignors to E. I. du Pont de Nemours and Company, Wilmington, Del., a corporation of Delaware No Drawing. Application September 4, 1952,
Serial No. 307,924

8 Claims. (Cl. 260—37)

This invention relates to novel filled polyamide compositions, and more particularly to compositions in which a nylon polyamide is admixed with a high percentage of metal filler.

Finely divided metals have frequently been employed in the past in admixture with thermoplastic and thermosetting resins to impart various properties, such as heat conductivity, reflective effects, thermal stability, etc. The quantity of metal used has generally been somewhat less than the quantity of resin, and for the most part use of excessive amounts of such metal fillers has been avoided since it was believed that fillers tended to lower the tensile strength, etc., of the filled compositions. It has been recognized, of course, that metal powders can be compacted without added resins, and a subsequent sintering operation can be used to bind the particles together; however, it has not been possible heretofore to prepare strong articles by such processes without sintering the metal.

An object of this invention is to provide compositions which combine certain desirable properties of plastics and of metals. Another object is to provide compositions which are metallic in appearance, have thermal conductivity, electrical conductivity, magnetic properties, resistance to creep, etc., but which resemble polyamide resins in ease of workability, and suitability for numerous special applications hereinafter described.

It has been discovered in accordance with this invention that nylon polyamide resin can be admixed with from 3 to 20 times its weight of finely divided metal filler (preferably about 8 to 15 times for copper, lead, nickel or iron, and somewhat less in the case of very light metals such as aluminum), to produce compositions which are almost as strong as unfilled nylon, and almost as hard as the metal used as filler. These compositions can be extruded in the form of strong filaments which conduct the electric current as do metal wires. The very highly filled compositions of this invention exhibit an electrical resistance in the range of from 1 ohm to about 0.01 ohm, or lower. A composition composed of 15 copper:1 nylon (weight proportions) had virtually no electrical resistance, the conductivity being not measurably different from that of unmodified copper. Plastic electromagnets are produced by using as fillers metals which have magnetic properties, particularly iron or mixtures of iron and nickel.

The following table records the thermal conductivity of nylon filled with finely divided metals.

TABLE I

Thermal conductivity of filled nylon compositions

| Filler Content, by Weight, Percent | Conductivity, B.t.u./hr./ ft.²/in./° F. |
|---|---|
| 15 Copper | 1.87 |
| 50 Copper | 2.92 |
| 60 Copper | 3.63 |
| 70 Copper | 4.68 |
| 33⅓ Aluminum | 3.09 |

The strength and hardness properties of filled compositions of this invention are set forth in the following table.

TABLE II

Physical properties of filled nylon compositions

| Filler Content, Percent by Weight | Tensile Strength, p. s. i. | Percent Elongation | Hardness Rockwell Units "m" scale | Hardness Shore "D" scale | Impact Strength "Izod", ft./lbs./in. |
|---|---|---|---|---|---|
| 33⅓ Aluminum | 9,340 | 10 to 20 | 67 | 81 | .808 |
| 33⅓ Graphite | 7,870 | 10 | 70 | 82 | .570 |
| 40 Copper | 9,660 | 10 | 81 | 82 | 1.120 |
| 50 Copper | 9,480 | 10 | 72 | 84 | .916 |
| 60 Copper | 9,760 | 10 | 83 | 86 | .911 |
| 70 Copper | 9,710 | 10 | 80 | 87 | 1.030 |
| Pure Nylon | 10,900 | 50 | ca. 54 | 92 | 1.50 |

The electrical conductivity of the compositions of this invention increases very rapidly as the content of metal is increased above the amounts employed in prior art compositions. This is shown in the following table.

TABLE III

Variation of electrical resistance with content of filler in copper-hexamethylene polyadipamide compositions

| Copper content | Resistance (ohms) |
|---|---|
| 94% | less than 0.01. |
| 90% | 1.0. |
| 60% | 60. |
| 50% | $10^6$. |

Any of the numerous methods of admixing nylon with the metal filler may be employed in preparing the composition of this invention. For preparation of filaments the mixture can be extruded through a die. For best results it is important that the metal be as finely divided as possible, a suitable size being 250 to 500 mesh or less. Best results are obtained when the particle size is less than 325 mesh. It is preferable that the shape of the metal particle be such that there be a maximum surface contact between the particles; rounded shapes may be used, but jagged shapes are preferred and generally provide greater strength. Nylon can be ball-milled to a fine size and mixed with the metal filler to give a product which can be molded readily. Alternatively, the metal may be admixed with the polymer melt in kneading equipment, while keeping the mixture enveloped in an inert gas. Admixing the metal with the polymer during its formation in the polymerization kettle is also possible, but is a comparatively difficult process to perform. In the case of a low density metal such as aluminum it is sometimes advantageous to employ a liquid medium to assist in mixing the polyamide with the metal. Another satisfactory method for mixing the polymer with the metal is to dissolve the polymer in a solvent and thoroughly admix into the solution the finely divided filler; the polymer can be precipitated by addition of a liquid which is a non-solvent for the nylon but which dissolves in the nylon solvent. The following procedure illustrates a preferred method for practicing this invention:

Into a ball mill is placed 10 parts of polyhexamethylene adipamide fiber, 22.5 parts of anhydrous calcium chloride, and 67 parts of methanol, and the mixture is milled at 25° C. for several hours to produce a viscous solution. To the mixture is added 90 parts of very finely divided copper metal (less than 325 mesh) and the resulting dispersion is atomized into 450 parts of methanol. In this way a powdery mixture in which the particles comprise 90% metal and 10% polyamide is produced. This is removed by centrifuging, washed with methanol and dried.

The powder thus obtained can be molded by compression at a temperature of 275° C. and a pressure of 750 pounds per square inch, and can also be extruded into shaped articles including strong electrically conducting filaments.

Using the procedure described above, mixed powders of nylon-aluminum, nylon-iron, nylon-nickel, nylon-lead, and mixtures of nylon with more than one of these metals can be prepared. These mixtures can be compacted in molds at temperatures of 275° C. to 280° C. under pressures in the range of 600 to 900 pounds per square inch to produce metallic-appearing shaped articles. Temperatures and pressures outside this range can also be used, optimum temperatures being about 15° to 75° above the melting point of the nylon used.

The nylon polymers which are employed in the practice of this invention are the synthetic linear polyamides of the types described in U. S. Patents 2,071,250, 2,071,253, and 2,130,948. These polyamides contain recurring carbonamide groups

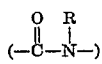

where R is hydrogen or a monovalent hydrocarbon radical, as an integral part of the main chain of atoms in the polymer. They are usually prepared by the action of heat upon a diamine salt of an alkandioic acid, but they may also be made by heating a lactam, such as caprolactam. Reclaimed polyamide resins may of course be employed in place of, or in combination with, virgin polymer.

The present invention differs from prior art compositions or processes wherein polymers have been admixed with metals in various forms, as hereinabove mentioned. This difference is due not only to the high content of metal in the applicant's composition, but it is due also to the nature of the resin which is used as a bonding agent. With nylon as the bonding agent, it is quite surprising that strength properties, etc., are not excessively impaired by the high content of metal filler. Because of the fact that high contents of such fillers can thus be present it has become possible to prepare strong, attractive, useful articles, which, as explained above, combine the properties of metals with those of plastics in an interesting and practical manner.

The invention may be employed effectively in the manufacture of molded articles, antifriction bearings, electrical brushes, sound-recording tapes and wires, fusible compositions which are of value in splicing or joining electrical conductors, and various other such practical applications involving the use of a strong plastic-metallic body having heat-conducting and electricity-conducting properties. Electrical conductors made by the process of this invention are generally less flexible than metal wires of similar size but they are of sufficient flexibility to permit their use for a wide variety of purposes including rheostat wires. A particularly significant practical application of the present invention is in nylon-lead bricks or other such materials of construction which resemble metal and which can be obtained over a range of densities and which can serve as barriers for very penetrating forms of radiant energy, such as gamma rays and other forms of energy produced by atomic fission. A composition comprising 4 parts by weight of lead and one part by weight of nylon, prepared in accord with the present invention was found to be effective as a barrier for short wave radiation such as X-rays. A similar composition comprising 12 lead:1 nylon was found to be not too high in lead content to be molded without melting the lead. Such structures have advantages over other lead barriers in ease of moldability, and also with respect to preventing lead poisoning by avoiding the necessity for lead burning.

Another valuable application is in heat exchange equipment, wherein corrosion of iron, or other metal, by steam is eliminated by the protective skin of nylon enveloping the individual particles of metal, without excessive loss of thermal conductivity. Nylons having a relatively high melting point (e. g. polyhexamethylene adipamide, M. P. 249° C.) are of course preferably chosen for the latter application.

We claim:

1. As a new composition of matter a linear synthetic polycarbonamide admixed with finely divided copper metal filler having a mesh size of 250 to 500, the quantity of said copper filler being 90% to 94% of the total weight of said polyamide plus copper, said copper being uniformly distributed throughout the said polycarbonamide, said polycarbonamide being a linear polycarbonamide wherein the carbonamide groups are an integral part of the main chain and in which the said carbonamide groups are separated by hydrocarbon groups of at least two carbon atoms.

2. Process which comprises extruding the composition of claim 1 through a die, whereby electrically conducting filaments are produced.

3. A material of construction comprising finely divided lead bonded together with linear synthetic polycarbonamide, the weight ratio of lead to said polycarbonamide being from 8:1 to 12:1, said polycarbonamide being a linear polycarbonamide wherein the carbonamide groups are an integral part of the main chain and in which the said carbonamide groups are separated by hydrocarbon groups of at least two carbon atoms.

4. A process for incorporating metal filler into a linear synthetic polycarbonamide which comprises disseminating said polycarbonamide in a mixture of methanol and calcium chloride, admixing metal filler therewith, the particle size of the said filler being less than 325 mesh, atomizing the resulting dispersion into methanol, separating the resulting solid phase from the liquid ingredients of the mixture, washing the solid phase to free it from calcium chloride, and drying the product thus obtained, whereby a product is formed which can be molded by compression at a temperature of 275° to 280° C., said polycarbonamide being a linear polycarbonamide wherein the carbonamide groups are an integral part of the main chain and in which the said carbonamide groups are separated by hydrocarbon groups of at least two carbon atoms.

5. Process of claim 4 wherein the weight ratio of metal filler to polycarbonamide is from 3:1 to 20:1.

6. Process of claim 4 wherein the metal filler is copper.

7. Process of claim 4 wherein the metal filler is copper, and the weight ratio of metal filler:polycarbonamide is 9:1.

8. As a new composition of matter a linear synthetic polycarbonamide admixed with a finely divided metal filler, said metal being of the class consisting of copper and lead, the quantity of said metal being from 8 to 15 times the quantity of said polycarbonamide, said metal being uniformly distributed throughout said polycarbonamide, said polycarbonamide being a linear polycarbonamide wherein the carbonamide groups are an integral part of the main chain and in which the said carbonamide groups are separated by hydrocarbon groups of at least two carbon atoms.

References Cited in the file of this patent

UNITED STATES PATENTS

| 2,246,086 | Austin | June 17, 1941 |
| 2,695,425 | Stott | Nov. 30, 1954 |

FOREIGN PATENTS

| 1,005,744 | France | Jan. 2, 1952 |